April 30, 1963 R. S. DAVIES 3,088,111
OBJECT DETECTING SYSTEM
Filed July 22, 1957 4 Sheets-Sheet 1
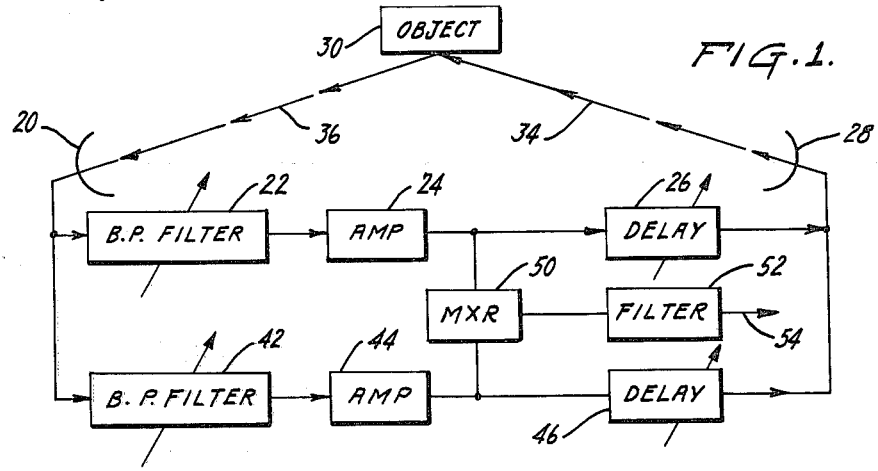
FIG. 1.
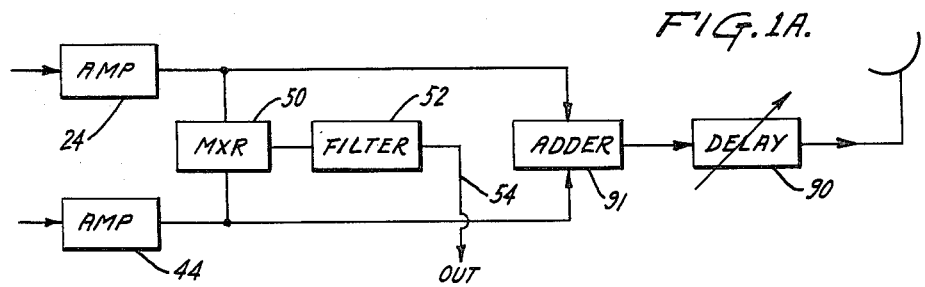
FIG. 1A.
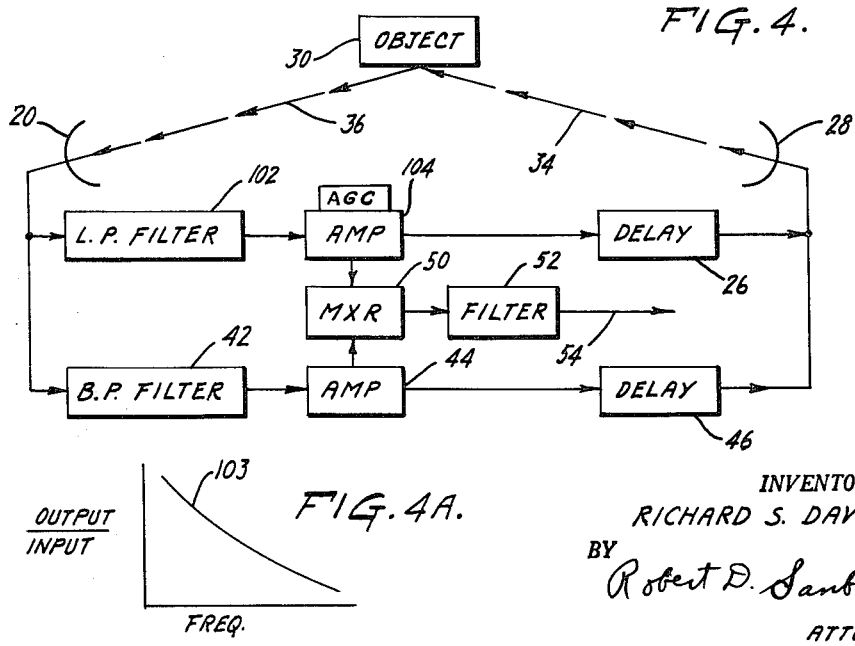
FIG. 4.
FIG. 4A.
INVENTOR.
RICHARD S. DAVIES
BY Robert D. Sanborn
ATTORNEY April 30, 1963 R. S. DAVIES 3,088,111
OBJECT DETECTING SYSTEM
Filed July 22, 1957 4 Sheets-Sheet 2

INVENTOR.
RICHARD S. DAVIES
BY Robert D. Sanborn
ATTORNEY

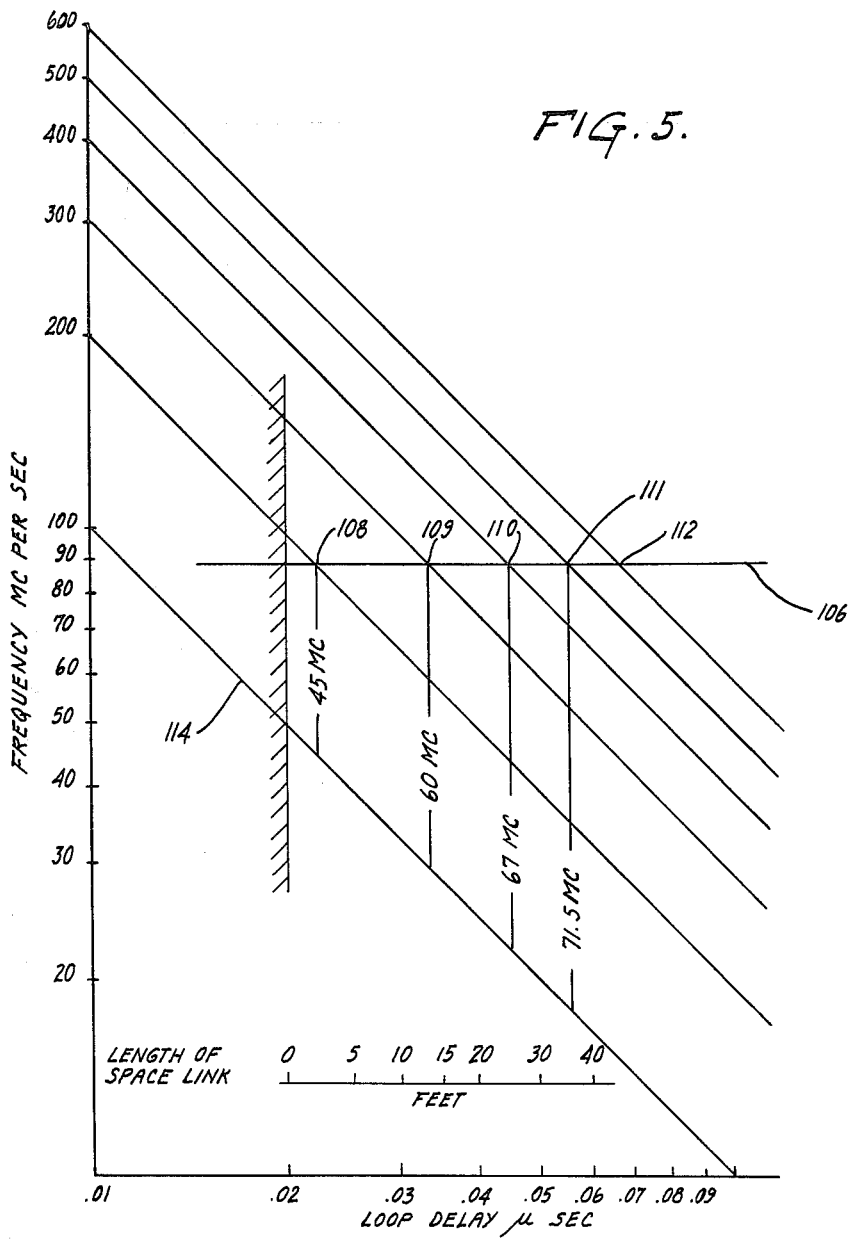

United States Patent Office 3,088,111
Patented Apr. 30, 1963

3,088,111
OBJECT DETECTING SYSTEM
Richard S. Davies, Palo Alto, Calif., assignor, by mesne assignments, to Philco Corporation, Philadelphia, Pa., a corporation of Delaware
Filed July 22, 1957, Ser. No. 674,270
18 Claims. (Cl. 343—12)

The present invention relates to object detection systems and more particularly to systems for indicating the presence of an object at a preselected distance therefrom.

Systems have been proposed for automatically applying the brakes of an automobile which approaches within preselected distance of a preceding automobile or other object in its path. Anticollision devices have been proposed for trains, boats and other moving objects. Proximity fuses for detonating missiles and bombs a preselected distance away from a target are frequently employed to increase the effectiveness of such missiles or bombs. All of the systems mentioned require a small, compact system capable of detecting the presence of an object in space and of providing an electrical signal when the object is at a preselected distance from the system. To be effective the systems should be capable of good range resolution and be relatively insensitive to all interfering signals.

Prior art systems for accomplishing the purposes mentioned have either been too bulky and complex or are too easily disturbed by interfering signals such as stray radiation from the system itself or nearby radio or radar systems and, in the case of military systems, by intentional interference by an enemy.

Therefore it is an object of the present invention to provide a simple, compact proximity indicating system.

It is a further object of the present invention to provide a proximity indicating system which is insensitive to external interference, either intentional or accidental.

Still another object of the invention is to provide a proximity indicating system which has excellent range discrimination.

Still another object of the invention is to provide a system in which the range at which the system will provide an output signal can be controlled.

Another object is to provide a device which will not radiate appreciable continuous wave energy except when in the vicinity of an object.

These and other objects of the invention are achieved by providing a system which includes two regenerative loops which are arranged to oscillate at different frequencies. Means are provided for heterodyning the signals generated by the two loops and additional means are provided for generating an output signal in response to a resultant heterodyne signal of a particular frequency. A space link from a transmitting antenna of the system to an object in space and from there back to a receiving antenna of the system forms a part of the feedback path of each loop. The frequency of oscillation or the presence of an oscillatory condition in each loop is made to be a function of the length of the space link. It is to be understood that the object which is detected is not necessarily an object which is movable in space. For example, in the case of a missile or a bomb, the object which gives rise to an output signal may be the surface of the earth or some structure thereon.

For a better understanding of the invention together with other and further objects thereof reference should now be made to the following detailed description which is to be read in conjunction with the accompanying drawings in which:

FIG. 1 is a block diagram of one preferred embodiment of the present invention which employs two regenerative loops each of which is restricted to a single frequency of oscillation;

FIG. 1A is a block diagram of a modification of the embodiment of FIG. 1 in which part of the two loops are combined;

FIG. 4 is a block diagram of a second embodiment of the present invention which employs one loop which oscillates continuously at a frequency which is determined by the length of the space link;

FIG. 4A is a plot of the filter characteristic in one of the loops of FIG. 4;

FIG. 5 is a plot showing certain of the operating characteristics of the system of FIG. 4;

Figure 2:
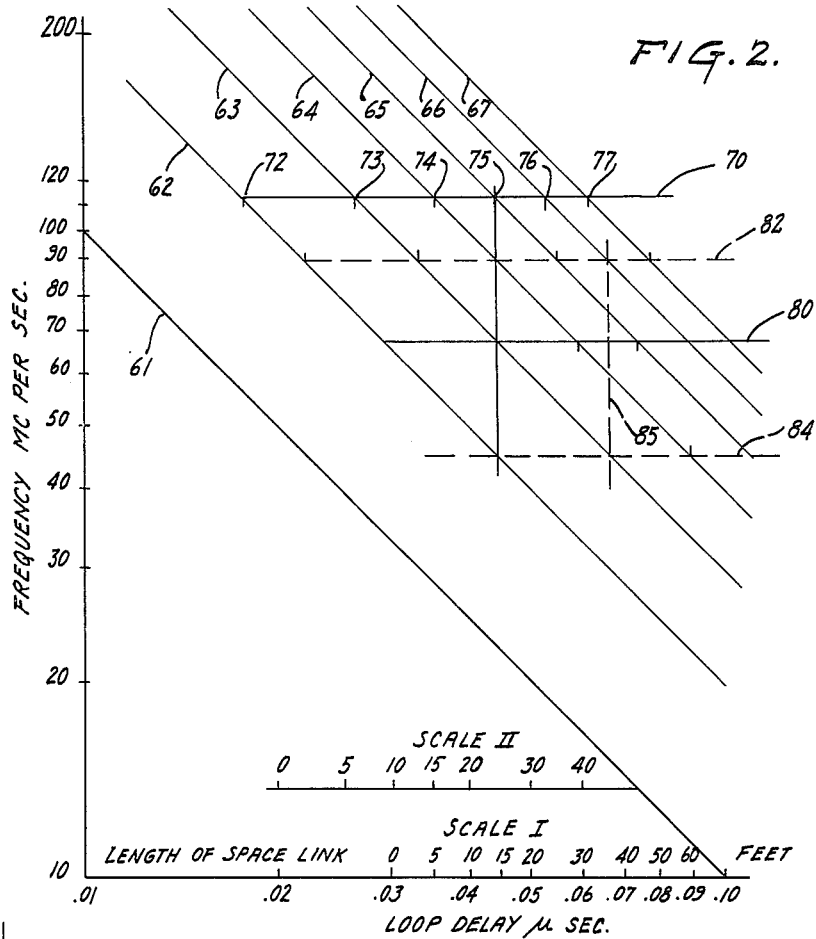
FIG. 2 is a plot which shows the conditions under which the two regenerative loops of FIG. 1 will oscillate.

Turning now to FIG. 1 the preferred embodiment of the invention comprises two regenerative loops each of which is restricted to a different frequency of oscillation. The first loop includes a receiving antenna 20 which supplies received signals to a bandpass filter 22. Filter 22 preferably is a narrow band filter with good rejection of signals lying outside the desired passband. Since the delay encountered by signals passing through the filter 22 will be a function of the bandwidth of the filter, the amount of time delay permitted must be considered in selecting the passband of filter 22. The output of filter 22 is connected to the input of an amplifier 24 which may be of conventional construction. As will be seen presently, the signals supplied to amplifier 24 are restricted to the band of frequencies passed by filter 22. For this reason it may be advantageous to employ relatively narrow band amplifier stages in amplifier 24 in order to achieve high loop gain with good signal-to-noise ratio. If the circuits of amplifier 24 are sufficiently selective, no separate filter 22 is required since amplifier 24 may perform the frequency selective function of filter 22.

The output circuit of amplifier 24 is connected through a delay device 26 to a transmitting antenna 28. Delay device 26 may be an electrical network or some form of acoustical delay line. Again, in the embodiment of FIG. 1 the signals supplied to delay line 26 are restricted in frequency to the frequencies within the passband of filter 22. For this reason the frequency response characteristic of delay line 26 is of no great importance. In systems designed for operation at short ranges, for example at ranges of 100 feet or less, the total delay of the loop from receiving antenna 20 to transmitting antenna 28 is preferably not greater than a few hundredths of a microsecond. In systems designed to provide an indication at less than 20 feet a value of from 0.1 microsecond to 0.3 microsecond would be typical. Filter 22 and amplifier 24 will introduce some delay. If any additional delay is required it is easily achieved by electrical or electromechanical means.

The signal supplied to antenna 28 is radiated into space. If an object, such as object 30, is within the path 34 of the radiated beam a portion of the radiated energy will be returned to receiving antenna 20 along path 36. The spacing between antennas 20 and 28 is not critical but is generally desirable to make this spacing small compared to the range to the target so that path 34 is nearly coincident with path 36.

It will be seen that the loop just described forms a phase shift oscillator circuit in which the space link 34–36 forms a portion of the phase shift circuit. Two requirements must be met if this loop is to oscillate. Amplifier 24 must have sufficient gain to overcome attenuation in the system including attenuation in the space link and, secondly, the length of the space link 34–36 must be such that the total phase shift around the loop including any phase inversions in amplifier 24 is equal to an integral multiple of the period of oscillation. There will always be a certain amount of thermal noise supplied by amplifier 24 to antenna 28 by way of delay device 26. Since this noise has a broad spectrum, it will contain components at frequencies lying within the passband of filter 22. If the two requirements mentioned above are met, these last-mentioned components will be returned to the input of amplifier 24, after reflection from object 30, in proper phase to reinforce the original thermal noise component. Thus a signal larger than the original noise component and still at a frequency within the passband of filter 22 is radiated from antenna 28, reflected from object 30, received by antenna 20 and returned by filter 22 to the input of amplifier 24. This regeneration or oscillation buildup will continue on successive passages of the continuous wave signal around the loop until the amplitude of the signal is limited in the usual fashion by some non-linear response in the loop. For example, the non-linear response may be the overloading of one or more stages of the amplifier 24.

In the examples chosen for illustration it has been assumed that the output signal of the amplifier 24 has the same phase as the input signal. However, it should be remembered that if the output signal of amplifier 24 is inverted with respect to the input signal, this is equivalent to a 180° phase delay in the loop. A 180° phase shift will require the delay provided by delay means 26 and the space link 34–36 to be one-half period longer or shorter than the values hereinafter mentioned in order to produce sustained oscillations.

Continuing now with the description of FIG. 1, antennas 20 and 28 together with bandpass filter 42, amplifier 44 and delay means 46 form a second oscillatory loop which is similar to the loop first described except that filter 42 has a different center frequency than filter 22. Delay means 46 may have the same delay as delay means 26 or it may have a different delay. The proper relationships between the passband frequencies of filters 22 and 42 and the delay times of delay means 26 and 46 will be explained in more detail in connection with the descriptions of FIGS. 2 and 3. Filters 22 and 42 and delay means 26 and 46 have been shown as being adjustable, but some or all of these elements may have fixed tuned or fixed delay characteristics if desired.

A heterodyne mixer 50 in FIG. 1 has one input connected to the output of amplifier 24 and a second input connected to the output of amplifier 44. Mixer 50 may be any one of the well known forms of heterodyne mixer circuits which will generate an output signal having a frequency equal to the sum or difference of the frequencies of the signals supplied to its two inputs. A bandpass filter 52, which is connected to the output of mixer 50, selects the desired frequency component from the complex signal appearing at the output of mixer 50. In the examples which follow it is assumed that filter 52 is tuned to the difference between the center frequencies of filters 22 and 42.

The operation of the circuit of FIG. 1 will now be explained with reference to the plot of FIG. 2. The X co-ordinate of FIG. 2 is total loop delay plotted on a logarithmic scale from .01 microsecond to .10 microsecond. The Y co-ordinate is oscillation frequency in megacycles per second also plotted on a logarithmic scale from 10 to 200 megacycles per second. The straight lines 61–67 indicate the possible frequencies of oscillation of a system having non-frequency sensitive elements between antenna 20 and antenna 28. In such a system there are several possible frequencies of oscillation for any given loop delay. The lowest frequency is that frequency at which the loop delay is equal to one period. The next higher frequency is that frequency at which the loop delay equals two periods and so on. As a practical matter there are only a limited number of frequenices at which the circuit will oscillate since the losses or attenuation in the filter, amplifier and delay circuits normally increase as the frequency increases. FIG. 2 also illustrates that there are several values of space link length at which a loop will oscillate at a selected frequency. Again these lengths are such that the total delay is equal to an integral multiple of a selected frequency of oscillation.

If it is assumed that the total delay from receiving antenna 26 to transmitting antenna 28, including the delay provided by delay means 26 is .03 microsecond, then a scale showing the length of the space link for each frequency of oscillation can be plotted along the X axis. The scale is shown as scale I in FIG. 2 and is plotted in feet. The foot is a convenient measure of distance since the delay encountered in propagating electromagnetic energy through space is approximately .001 $\mu$sec. per ft.

Suppose now that the circuit of FIG. 1 is to produce an output signal only when the length of the space link is 15 ft., that is, when the range to the object is 7.5 ft., assuming the space between antennas 20 and 28 to be small compared to 15 ft. It is first necessary to select a frequency for filter 22 such that the loop including this filter will oscillate for a space link length of 15 ft. Line 70 of FIG 2 represents such a frequency. In the example chosen, the center frequency of filter 22, represented by line 70 is 112 megacycles per sec. For reasons which will be seen presently the bandwidth of filter 22 is selected to be not more than one or two megacycles. Points 72–77 on line 70 indicate the values of total loop delay at which the loop including filter 22 will oscillate. Point 75 corresponds to the selected space link length or space distance of 15 ft.

For simplicity it will be assumed that delay means 46 has the same delay as delay means 26. Therefore the lines 61–67 of FIG. 2 also represent the possible operating characteristics for the loop including filter 42. The passband of filter 42 is so selected that the loop including filter 42 will oscillate at the selected space link length or space distance of 15 ft. but so that there is no other value of space distance at which both loops will oscillate. Line 80 in FIG. 2 at a frequency of 68 megacycles per sec. represents the center frequency of filter 42. It will be noted that the points of intersection of line 80 with lines 62 and 64 to 67 do not lie directly below any of the points of intersection of line 70 with lines 62 to 64, 66 and 67.

If the length of the space link is the selected value, 15 ft., both loops will oscillate, and mixer 50 will produce an output signal equal to the difference between the frequency of oscillation of the two loops, that is at a frequency equal to the difference between 112 megacycles and 68 megacycles. Filter 52 is tuned to this difference frequency of 44 megacycles and will supply the difference signal to output connection 54. Filter 52 preferably has a relatively narrow bandwidth so that it will pass only the difference frequency when both loops are oscillating and will block all signals when only one of the two loops is oscillating.

In the example chosen for illustration both loops will oscillate for a space distance of 15 ft. At all other space distances not more than one loop will oscillate at a time so that no beat note will be present at the input of filter 52. It is convenient to speak in terms of a single frequency of oscillation occurring when the object is exactly at a selected distance from the system. Actually, however, the two loops will both start oscillating at a frequency slightly lower than the indicated frequencies if the space distance is only slightly more than the selected distance and will continuously change in frequency to values slightly higher than the indicated values as the space distance decreases to a value slightly less than the selected distance. If the bandwidths of filters 22, 42 and 52 are made narrow, the range of distances over which oscillations continue is so slight that, in most instances, it can be considered that they occur for only the center value of this range.

The values represented by lines 70 and 80 are not the only frequencies to which filters 22 and 42 may be tuned to give satisfactory operation of the system. However, if it is desired that an output signal be generated for only one object distance, care should be taken in selecting the frequencies to see that there are not two different space distances at which both loops will oscillate. For example, lines 82 and 84 represent two frequencies which will permit oscillation of both loops at a space distance of 15 ft. In addition, the two loops will also oscillate at a space distance of approximately 38 ft. as indicated by line 85. Unless filters 22 and 42 have extremely sharp bandpass characteristics an unwanted output signal would occur for this space distance of approximately 38 ft.

In selecting the frequencies of oscillation of each loop consideration should be given to the relationship between the bandwidths and corresponding time delays of filters 22 and 42. If filters 22 and 42 are required to have very narrow passbands the inherent time delay using simple LCR circuits may be greater than can be tolerated in the loop. More complex filters such as bridged-T filters may be employed to reduce this inherent time delay but it is sometimes more desirable to shift to different frequencies of operation which will permit the use of time delay-bandwidth relationships which are compatible with simple LCR circuits.

As long as the delays from antenna 20 to antenna 28 remain equal for the two loops, changing the delay of delay means 26 and 46 has the effect of moving the space distance scale of FIG. 2 to the left or right without changing the other scales or position of the lines 61 through 67. However it should be noted that the intervals between units on the space distance scale will change owing to the logarithmic scale for the X co-ordinate. Scale II of FIG. 2 illustrates that if delay means 26 and 46 are changed so that the loops have a delay exclusive of the space distance equal to .02 microsecond, the output signal will occur for a space distance of 25 ft. rather than 15 ft. Thus the space distance at which an output signal is provided can be made a function of a selected variable by causing the delay introduced by delay means 26 and 46 to be a function of this variable. For example, in an automobile braking system the delay might be a function of speed. Therefore the distance at which a signal is given to apply the brakes would be a function of speed also.

FIG. 1A illustrates a modification of the circuit of FIG. 1 in which the two delay means 26 and 46 have been replaced by a single delay means 90. An adder circuit 91 linearly combines the signals from amplifiers 24 and 44 without heterodyning. Delay means 90 must have a passband which includes the frequencies passed by both filter 22 and filter 42 of FIG. 1. Delay means 90 may be made adjustable if desired.

Changing the delay of delay means 90 of FIG. 1A or delay means 26 and 46 of FIG. 1 without changing the characteristics of filters 22 and 42 will change the space distance at which an indication is produced at output 54. On the other hand, it is possible to obtain an indication at 15 ft., for example, for different values of delay between antenna 20 and antenna 28. For example, a delay of .025 microsecond with filter passbands at 100 mc. and 75 mc. will operate satisfactorily.

Figure 3:
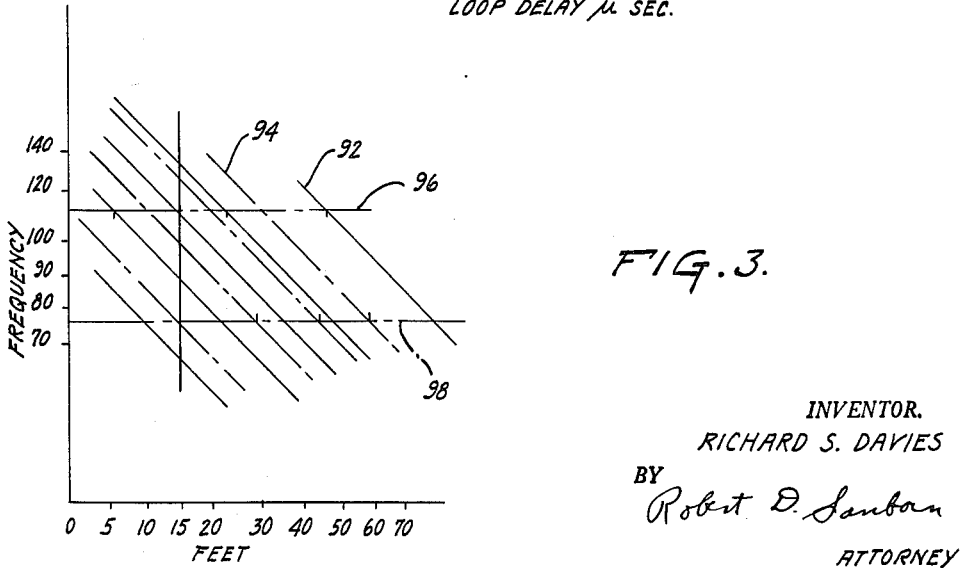
FIG. 3 is a second plot of the operating characteristics of FIG. 1 for different values of circuit constants.

In all of the above examples equal delays in each of the loops has been assumed. FIG. 3 is a plot of the operating characteristics of the system of FIG. 1 where the loops have different delays exclusive of the space link. The X co-ordinate of FIG. 3 is space distance in feet plotted on a logarithmic scale. The Y co-ordinate is frequency in megacycles also plotted on a logarithmic scale. The solid lines 92 represent the characteristics of the loop having a .03 μsec. internal delay. The broken lines 94 represent the characteristic of a loop having an internal delay of .026 μsec. It should be noted that the effect of different delays is to displace one set of characteristics with respect to the other set without changing the slope of the lines. Assuming that the loop including filter 22 has the delay of .03 μsec., if filter 22 has a passband centered at 112 mc., as represented by line 96, and filter 42 has a passband centered at 76 megacycles, as represented by line 98, a beat note will be produced for a space distance of 15 ft. but for no other distance. Mixer 50 of FIG. 1 will provide a signal having a frequency component of 112 minus 76 or 36 mc. Filter 52 may be tuned in this difference frequency of 36 mc. or to some other heterodyne component which is present only when both loops are oscillating, such as the sum of 112 mc. and 76 mc. or 188 mc.

The embodiment of the invention shown in FIG. 4 is similar to the embodiment shown in FIG. 1 except that bandpass filter 22 of FIG. 1 has been replaced by a low pass filter 102 and amplifier 24 has been replaced by an amplifier 104 having an automatic gain control circuit. Parts of FIG. 4 corresponding to like parts in FIG. 1 have been given the same reference numerals. FIG. 4A is a plot showing the transfer characteristic of filter 102. As shown by line 103 of FIG. 4A the attenuation of filter 102 increases as the frequency of the signal passed therethrough increases.

The automatic gain control circuit of amplifier 104 adjusts the gain of this amplifier so that the loop gain is unity at the lowest possible frequency of oscillation for any space distance. Since the attenuation of filter 102 increases with increasing frequency, the loop gain for higher frequencies at which the loop delay is an integral number of cycles will have a loop gain of less than unity and oscillations will not be maintained at these higher frequencies.

FIG. 5 is a plot which illustrates the operating characteristics of the circuit of FIG. 4. The co-ordinates of FIG. 5 are the same as for FIG. 2. It is assumed that delay means 26 and 46 both have a delay of .02 microsecond. Line 106 represents the passband of filter 42. In the example chosen for illustration the passband of filter 42 is centered at 89 mc. The loop including filter 42 will oscillate only at ranges corresponding to points 108–112.

Line 114 represents the change in frequency of the loop including filter 102 as the total loop delay changes. It should be understood that, whereas the loop including filter 42 oscillates only at one frequency and then only for certain space distances, the loop including filter 102 oscillates continuously at a frequency which is determined by the space distance. As a result, mixer 50 of FIG. 4 will provide a beat signal which will be at one of several discrete frequencies depending upon the length of the space link. Filter 52 of FIG. 4 may be tuned to select one of these frequencies. For example if filter 52 is tuned to 67 megacycles, an output signal will be obtained for a space distance of 25 ft. Similarly if filter 52 is tuned to 60 megacycles an output signal will be obtained for a space distance of 13 ft.

The distances at which an output signal is provided may be selected by selecting the delay times for each loop and the frequency to which filter 52 is tuned. In choosing the frequencies of operation care should be taken to see that the maximum possible frequency of oscillation of the continuously oscillating loop is less than the selected beat frequency, otherwise an undesired signal may appear at the output connection 54 when the frequency of the continuously oscillating loop is equal to the selected beat frequency. It should be understood also that amplifier 44 may have a relatively narrow passband since the loop including this amplifier oscillates at only one frequency but amplifier 104 must have a wider passband which is broad enough to include all possible frequencies of oscillation of the loop including filter 102 and amplifier 104.

Figure 6:
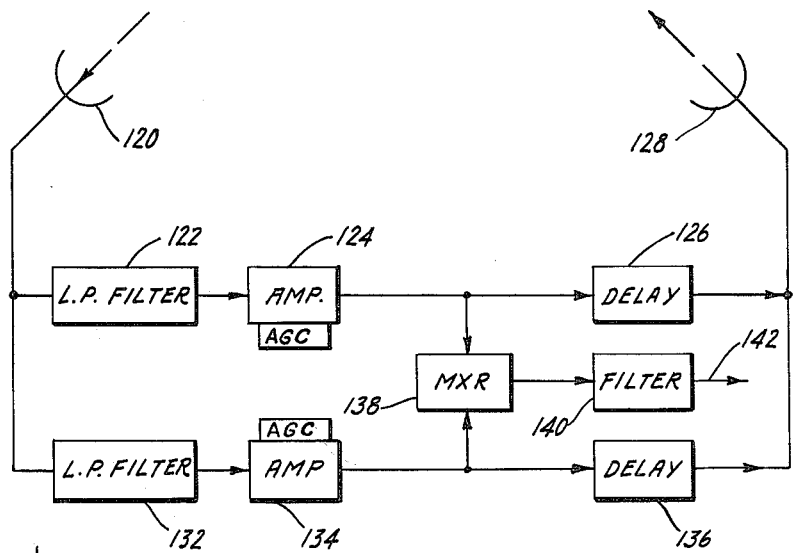
FIG. 6 is a block diagram of an embodiment of the present invention employing two continuously oscillating loops.

FIG. 6 illustrates an embodiment of the invention which employs two continuously oscillating loops. Antennas 120 and 128 of FIG. 6 correspond to antennas 20 and 28, respectively, in FIG. 1. One loop comprises these two antennas connected by the series combination of filter 122, amplifier 124 and delay means 126. The second loop includes these two antennas 120 and 128 and the series combination of filter 132, amplifier 134 and delay means 136. The space link between antenna 128 and antenna 120 is common to both loops. Filters 122 and 132 preferably have a transfer characteristic of the type shown in FIG. 4A.

A heterodyne mixer 138 is connected to the outputs of amplifiers 124 and 134. A narrow band filter 140 which follows mixer 138 selects a particular beat frequency to be supplied to output connection 142.

Figure 7:
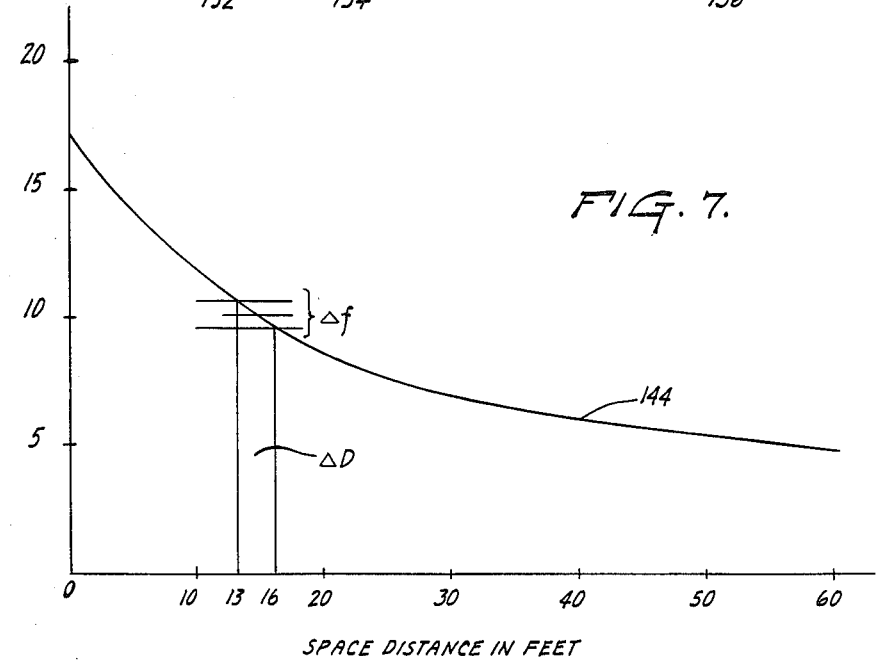
FIG. 7 is a plot of frequency v. range at the output of the heterodyne mixer in the embodiment of FIG. 6.

In the embodiments previously described the delay of the two loops exclusive of the space link could be equal or unequal as desired. In the embodiment of FIG. 6 this fixed delay of the two loops must be unequal otherwise the two loops would always oscillate at the same frequency. FIG. 7 is a plot showing the variation of beat frequency signal produced by mixer 138 as a function of variations in the space distance between antenna 128 and antenna 120. Linear co-ordinates are employed in FIG. 7. The plot shown assumes an interval or fixed delay of .02 microsecond for one loop and .015 microsecond for the other loop. As shown by line 144, the beat frequency decreases rapidly for short distances between the two antennas but less rapidly as the distance increases. The frequency band $\Delta f$ represents the passband of filter 140. The beat frequency lies within this passband for space distances of from 13 to 16 ft. In the embodiments previously described the range discrimination of the system is fixed by the selectivity of the bandpass filters in one or both loops. In the embodiment of FIG. 6 the range discrimination of the system is fixed by the selectivity of filter 140.

The system of FIG. 7 is more susceptible to interfering signals than the system of FIG. 1. For example an interfering signal at the beat frequency might pass through filter 122, amplifier 124, mixer 138 and filter 140 and appear as a false signal at output 142. This susceptibility to interfering signals can be minimized by employing a balanced mixer circuit for mixer 138 or by selecting the beat frequency to be below the lowest frequency of oscillation of either loop and including an element having a high pass filter characteristic in each loop between antenna 120 and mixer 138 to prevent the direct feed through of a signal at the beat frequency. The circuits of FIGS. 4 and 6 share the common disadvantage that they radiate continuous wave energy even though the object is not at the proper distance to provide an output signal. The circuit shown in FIG. 6 has the advantage that the space distance at which an indication is produced can be varied by varying the delay time of delay means 126 or 136 or by varying the position of the passband of filter 140.

It should be obvious to those skilled in the art that the order of the filter means, the amplifier and the delay means in each of the loops may be rearranged without altering the mode of operation of the invention. Similarly the heterodyne mixer in each circuit may be connected to any convenient point in each loop. The point following the amplifier is preferred because of the relatively high signal level at this point. Other modifications which may be made include modulating the amplified signal on a suitable carrier before it is supplied to the transmitting antenna and then removing the carrier at a point following the receiving antenna. A carrier frequency may also be employed for transmission through the delay means if desired.

While the invention has been described with reference to certain preferred embodiments thereof, it will be apparent that other embodiments and further modifications within the scope of the invention will occur to those skilled in the art. Accordingly I desire the scope of my invention to be limited only by the appended claims.

What is claimed is:

1. A system for indicating the presence of an object at a preselected distance from said system, said system comprising first and second regenerative loops for generating electrical oscillations, each of said loops being closed by a space link extending from said system to said object and back, frequency controlling means in each of said loops, said frequency controlling means in each loop including means for restricting the frequency of oscillation of each of said loops to a preselected frequency band, and means for causing said two loops to oscillate with a selected difference between the oscillating frequencies at only one length of said space link, a heterodyne mixer having a first input connected to receive a signal from one of said regenerative loops and a second input connected to receive a signal from the other one of said regenerative loops and means connected to the output of said heterodyne mixer for selecting one of the heterodyne signals appearing at the output of said mixer.

2. A system for indicating the presence of an object at a preselected distance from said system, said system comprising first and second regenerative loops for generating electrical oscillations, each of said loops including an amplifier means and a feedback path connecting the output of said amplifier to the input thereof, the feedback path for each of said loops including as a part thereof a space link extending from said system to said object and back, said space link introducing a delay in each of said feedback paths proportional to the length of said space link, means for restricting the frequency of oscillation of each of said loops to a preselected frequency band, means in each of said loops for causing said two loops to oscillate with a selected difference between the oscillating frequencies at only one length of said space link, a heterodyne mixer having a first input connected to receive a signal from one of said regenerative loops and a second input connected to receive a signal from the other one of said regenerative loops and means connected to the output of said heterodyne mixer for selecting one of the heterodyne signals appearing at the output of said mixer.

3. A system for indicating the presence of an object at a preselected distance therefrom, said system comprising first and second regenerative loops for generating electrical oscillations, each of said loops comprising a receiving antenna, a transmitting antenna and means connecting said receiving antenna to said transmitting antenna, said last-mentioned means including at least an amplifier and frequency controlling means for restricting the frequency of oscillation of said loop to a preselected frequency band, said transmitting antenna being arranged to direct energy into space along a selected path, said receiving antenna being arranged to receive energy reflected from an object positioned in the path of said transmitted energy, said frequency controlling means of said two loops being arranged to cause said two loops to oscillate at different frequencies for the same space distance between the transmitting antenna of each loop and the receiving antenna of that loop, a heterodyne mixer having a first input connected to receive a signal from one of said regenerative loops and a second input connected to receive a signal from the other one of said regenerative loops and means connected to the output of said heterodyne mixer for selecting one of the heterodyne signals appearing at the output of said mixer.

4. A system for indicating the presence of an object at a preselected distance therefrom, said system including a transmitting antenna arranged to direct energy into space along a selected path, a receiving antenna arranged to receive energy reflected from an object positioned in the path of said transmitted energy and first and second signal transmission circuits connecting said receiving antenna to said transmitting antenna, each of said signal transmission circuits including amplifier means and frequency controlling means for restricting the frequency of oscillation of the loop comprising that signal transmission circuit and the space link between said transmitting antenna and said receiving antenna to a preselected frequency band, said frequency controlling means restricting said two loops to different frequencies for the same space link between said transmitting antenna and said receiving antenna, a heterodyne mixer having a first input connected to receive a signal from one of said regenerative loops and a second input connected to receive a signal from the other one of said regenerative loops and means connected to the output of said heterodyne mixer for selecting one of the heterodyne signals appearing at the output of said mixer.

5. A system for indicating the presence of an object at a preselected distance therefrom, said system including a transmitting antenna arranged to direct energy into space along a selected path, a receiving antenna arranged to receive energy reflected from an object positioned in the path of said transmitted energy, and first and second signal transmission circuits connecting said receiving antenna to said transmitting antenna, said first circuit including amplifier means and filter means having a narrow passband, whereby the loop formed by said first circuit and the space link from said transmitting antenna to said object and thence to said receiving antenna will oscillate only for selected lengths of said space link, said second circuit including amplifier means and frequency controlling means for restricting the second loop including said second circuit and said space link to an instantaneous oscillation frequently which is different from the frequency of said passband of said filter means in said first circuit, a heterodyne mixer having a first input connected to receive a signal from said first circuit and a second input connected to receive a signal from said second circuit, and filter means connected to the output of said heterodyne mixer for passing only signals appearing at the output of said mixer which have frequencies within a selected band.

6. A system in accordance with claim 5 wherein said second loop is arranged to oscillate at a frequency determined by the length of said space link over a range of frequencies which is wide compared to said narrow passband of said filter means in said first circuit and wherein said filter means connected to the output of said mixer has a relatively narrow passband which includes the frequency equal to the difference between the frequency of oscillation of said first loop and the frequency of oscillation of said second loop at one length of said space link at which said first loop will oscillate.

7. A system in accordance with claim 5 wherein said frequency determining means in said second circuit has a relatively narrow passband at a frequency different from the frequency of said passband of the filter of said first circuit, said passbands being so chosen that said two loops will both oscillate at one selected length of said space link and no other.

8. A system for indicating the presence of an object at a preselected distance therefrom, said system including a transmitting antenna arranged to direct energy into space along a selected path, a receiving antenna arranged to receive energy reflected from an object positioned in the path of said transmitted energy, and first and second signal transmission circuits connecting said receiving antenna to said transmitting antenna, each of said circuits including a narrow band filter, an amplifier and a delay means, at least said filter means being individual to each circuit, the filter in said first circuit having a different passband from the filter in said second circuit, a heterodyne mixer having first and second inputs connected to said first and second signal transmission circuits respectively, and filter means connected to the output of said mixer and arranged to pass only a selected one of the heterodyne signals generated by said mixer.

9. A system in accordance with claim 8 in which the delay of the delay means in at least one of said two transmission circuits is adjustable, whereby the object distance at which an indication is obtained may be varied.

10. A system for indicating the presence of an object at a preselected distance therefrom, said system including a transmitting antenna arranged to direct energy into space along a selected path, a receiving antenna arranged to receive energy reflected from an object positioned in the path of said transmitted energy, and first and second signal transmission circuits connecting said receiving antenna to said transmitting antenna, each of said circuits including a filter, an amplifier and a delay means, said filter means in at least one of said circuits having an attenuation which increases as the frequency of the signal supplied thereto increases, each amplifier associated with a filter means having the above-described characteristic being provided with an automatic gain control circuit whereby the loop including said last-mentioned filter and amplifier is limited to the lowest possible frequency of oscillation, one means selected from said filter and delay means in one circuit having a different characteristic than the corresponding means in the other circuit whereby said two loops are caused to oscillate at different frequencies for selected object distances, a heterodyne mixer having first and second inputs connected to said first and second signal transmission circuits respectively, and filter means connected to the output of said mixer and arranged to pass only a selected one of the heterodyne signals generated by said mixer.

11. A system for indicating the presence of an object at a preselected distance therefrom, said system comprising first and second regenerative loops for generating electrical oscillations, each of said loops including a signal transmitting means arranged to direct energy into space along a selected path, a signal receiving means arranged to receive energy reflected from an object positioned in the path of said transmitted energy, and a signal transmission circuit connecting said signal receiving means to said signal transmitting means, at least a portion of said signal transmission circuit being independent of the signal transmission circuit of said other loop, said signal transmission circuit in said first loop including amplifier means and filter means having a narrow passband whereby said first loop will oscillate for only selected lengths of the space link from said signal transmitting means to said object in space and back to said signal receiving means, said signal transmission circuit in said second loop including an amplifier and a frequency controlling means separate from said filter means in said first loop, said frequency controlling means in said second loop restricting said second loop to an instantaneous oscillation frequency which is different from the frequency of said passband of said filter means, a heterodyne mixer having a first input connected to receive a signal from said first loop and a second input connected to receive a signal from said second loop, and filter means connected to the output of said heterodyne mixer for passing only signals appearing at the output of said mixer which have frequencies within a selected range.

12. A system in accordance with claim 11 wherein said second loop is arranged to oscillate at a frequency determined by the length of said space link over a range of frequencies which is wide compared to said narrow passband of said filter means in said first loop and wherein said filter means connected to the output of said mixer has a relatively narrow passband which includes the frequency equal to the difference between the frequency of oscillation of said first loop and the frequency of oscillation of said second loop at one length of said space link at which said first loop will oscillate.

13. A system in accordance with claim 11 wherein said frequency determining means in said second loop has a relatively narrow passband at a frequency different from the frequency of said passband of the filter in said first circuit, said passbands being so chosen that said two loops will oscillate simultaneously at only a limited number of selected lengths of said space link.

14. A system in accordance with claim 13 wherein said two loops will oscillate simultaneously at only one selected length of said space link.

15. A system for indicating the presence of an object at a preselected distance therefrom, said system comprising first and second regenerative loops for generating electrical oscillations, each of said loops comprising a receiving antenna, a transmitting antenna and means connecting said receiving antenna to said transmitting antenna, said last-mentioned means including at least an amplifier, first means providing delay in the transmission of the signal from said receiving antenna to said transmitting antenna, and second means for restricting the frequency of oscillation of said loop to a preselected frequency band, said transmitting antenna being arranged to direct energy into space along a selected path, said receiving antenna being arranged to receive energy reflected from an object positioned in the path of said transmitted energy, said frequency controlling means of said two loops being arranged to cause said two loops to oscillate at different frequencies for the same space distance between the transmitting antenna of each loop and the receiving antenna of that loop, the characteristic of one of said first and second means in at least one of said loops being adjustable to select the length of the space link at which the loop with which said adjustable means is associated will oscillate, a heterodyne mixer having a first input connected to receive a signal from one of said regenerative loops and a second input connected to receive a signal from the other one of said regenerative loops and means connected to the output of said heterodyne mixer for selecting one of the heterodyne signals appearing at the output of said mixer.

16. A system in accordance with claim 8 in which the passband of at least one of said narrow band filters is adjustable whereby the object distance at which an indication is obtained may be varied.

17. A system for indicating the presence of an object at a preselected distance therefrom, said system comprising first and second regenerative loops for generating electrical oscillations, each of said loops including a signal transmitting means arranged to direct energy into space along a selected path, a signal receiving means arranged to receive energy reflected from an object positioned in the path of said transmitted energy, a narrow band filter, an amplifier and a delay means, said narrow band filter of said first loop providing a signal path which is separate from the signal path of said narrow band filter of said second loop, said delay means being common to said two loops, the narrow band filter in said first loop having a different passband from the narrow band filter in said second loop, a heterodyne mixer having first and second inputs connected to said first and second regenerative loops, respectively, and additional filter means connected to the output of said mixer and arranged to pass only a selected one of the heterodyne signals generated by said mixer.

18. A system for indicating the presence of an object at a preselected distance from said system, said system comprising first and second regenerative loops for generating electrical oscillations, each of said loops being closed by a space link extending from said system to said object and back, means for restricting the frequency of oscillation of each of said loops to a preselected frequency band, said frequency band being different for each loop, the preselected frequency bands of said first and second loops being so chosen that said first and second loops will oscillate simultaneously for only certain selected lengths of the space links closing said loops, a heterodyne mixer having a first input connected to receive a signal from one of said regenerative loops and a second input connected to receive a signal from the other one of said regenerative loops and means connected to said heterodyne mixer for selecting one of the heterodyne signals appearing at the output of said mixer.

References Cited in the file of this patent

UNITED STATES PATENTS

| | | |
|---|---|---|
| 1,750,668 | Green | Mar. 18, 1930 |
| 2,424,263 | Woodyard | July 22, 1947 |